(12) United States Patent
Schmalzried et al.

(10) Patent No.: US 11,905,014 B2
(45) Date of Patent: Feb. 20, 2024

(54) TERMINAL AREA OPERATION OF UAVS FOR PACKAGE DELIVERY SYSTEM

(71) Applicant: WING Aviation LLC, Mountain View, CA (US)

(72) Inventors: James Schmalzried, San Jose, CA (US); Benjamin Jacobs, Menlo Park, CA (US); Brandon Jones, Redwood City, CA (US); Stephen Lacy, Mountain View, CA (US); Jonathan Lesser, Oakland, CA (US); Aditya Undurti, Dublin, CA (US); André Prager, Sunnyvale, CA (US)

(73) Assignee: WING Aviation LLC, Mountain View, CA (US)

( * ) Notice: Subject to any disclaimer, the term of this patent is extended or adjusted under 35 U.S.C. 154(b) by 361 days.

(21) Appl. No.: 17/076,506

(22) Filed: Oct. 21, 2020

(65) Prior Publication Data

US 2022/0119105 A1    Apr. 21, 2022

(51) Int. Cl.

| | |
|---|---|
| B64C 39/02 | (2023.01) |
| G05D 1/10 | (2006.01) |
| G05D 1/06 | (2006.01) |
| B64U 50/19 | (2023.01) |
| B64U 50/34 | (2023.01) |
| B64U 101/30 | (2023.01) |

(Continued)

(52) U.S. Cl.
CPC ......... *B64C 39/024* (2013.01); *G05D 1/0653* (2013.01); *G05D 1/104* (2013.01); *G05D 1/106* (2019.05); *B64U 50/19* (2023.01); *B64U 50/34* (2023.01); *B64U 2101/30* (2023.01); *B64U 2101/60* (2023.01)

(58) Field of Classification Search
None
See application file for complete search history.

(56) References Cited

U.S. PATENT DOCUMENTS

| 9,321,531 B1 | 4/2016 | Takayama et al. |
|---|---|---|
| 9,346,560 B2 | 5/2016 | Wang |

(Continued)

FOREIGN PATENT DOCUMENTS

| CN | 104166355 A | 11/2014 |
|---|---|---|
| CN | 104236548 B | 4/2017 |

(Continued)

OTHER PUBLICATIONS

International Search Report and Written Opinion dated Jan. 28, 2022 in corresponding International Patent Application No. PCT/US2021/055275, 12 pages.

*Primary Examiner* — Thomas E Worden
(74) *Attorney, Agent, or Firm* — CHRISTENSEN O'CONNOR JOHNSON KINDNESS PLLC (57) ABSTRACT

A technique for operating unmanned aerial vehicles (UAVs) in a terminal area from which the UAVs are staged includes charging a plurality of the UAVs on charging pads disposed in a staging array at the terminal area. Merchant facilities for preparing packages for delivery by the UAVs are disposed about a periphery of the staging array. The UAVs are relocated under their own propulsion from interior charging pads to peripheral loading pads of the staging array as the peripheral loading pads become available and the UAVs are deemed sufficiently charged and ready for delivery missions.

24 Claims, 8 Drawing Sheets

(51) Int. Cl.
  *B64U 101/60* (2023.01)
  *G05D 1/00* (2006.01)

(56) References Cited

U.S. PATENT DOCUMENTS

| | | | |
|---|---|---|---|
| 9,412,280 B1 | 8/2016 | Zwillinger et al. | |
| 9,505,493 B2* | 11/2016 | Borko | B64F 1/0297 |
| 9,671,791 B1 | 6/2017 | Paczan | |
| 9,815,633 B1 | 11/2017 | Kisser et al. | |
| 9,915,956 B2 | 6/2018 | Bokeno et al. | |
| 10,336,543 B1* | 7/2019 | Sills | G05D 1/0027 |
| 10,597,157 B1 | 3/2020 | Schmalzried et al. | |
| 10,671,064 B2 | 6/2020 | Schmalzried et al. | |
| 2014/0032034 A1 | 1/2014 | Raptopoulos et al. | |
| 2014/0304107 A1 | 10/2014 | Mcallister | |
| 2015/0370251 A1* | 12/2015 | Siegel | B64C 39/024 |
| | | | 701/2 |
| 2016/0236582 A1 | 8/2016 | Wang | |
| 2016/0275801 A1 | 9/2016 | Kopardekar | |
| 2016/0355337 A1 | 12/2016 | Lert et al. | |
| 2016/0364989 A1 | 12/2016 | Speasl et al. | |
| 2017/0092109 A1 | 3/2017 | Trundle et al. | |
| 2017/0225799 A1 | 8/2017 | Selwyn et al. | |
| 2017/0313421 A1 | 11/2017 | Gil | |
| 2017/0344000 A1 | 11/2017 | Krishnamoorthy et al. | |
| 2018/0053139 A1* | 2/2018 | Stoman | G05D 1/0676 |
| 2018/0072420 A1 | 3/2018 | Prager et al. | |
| 2018/0094935 A1 | 4/2018 | O'Brien et al. | |
| 2018/0155029 A1 | 6/2018 | Gil | |
| 2020/0086987 A1* | 3/2020 | Schmalzried | G06Q 10/06315 |
| 2020/0130864 A1* | 4/2020 | Brockers | B60L 53/37 |
| 2020/0201318 A1 | 6/2020 | Schmalzried et al. | |
| 2023/0141818 A1* | 5/2023 | Cho | G05D 1/101 |
| | | | 701/3 |

FOREIGN PATENT DOCUMENTS

| | | |
|---|---|---|
| CN | 207311860 U | 5/2018 |
| CN | 109863084 A | 6/2019 |
| JP | 201777879 A | 4/2017 |
| KR | 101712280 A | 2/2017 |
| WO | 2016137982 A1 | 9/2016 |
| WO | 2018078588 A1 | 5/2018 |
| WO | 2020060927 A1 | 3/2020 |

* cited by examiner

TERMINAL AREA OPERATION OF UAVS FOR PACKAGE DELIVERY SYSTEM

TECHNICAL FIELD

This disclosure relates generally to navigation and control of unmanned aerial vehicles (UAVs), and in particular but not exclusively, relates to navigation and control of UAVs in proximity to a terminal area.

BACKGROUND INFORMATION

An unmanned vehicle, which may also be referred to as an autonomous vehicle, is a vehicle capable of travel without a physically-present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Controlling unmanned vehicles can be problematic especially when there are a large number of vehicles in close proximity. For unmanned aerial vehicles (UAVs), the terminal area from which the UAVs are staged (e.g., loaded, charged, stored, etc.) can be a high congestion choke point requiring specialized procedures to maintain an efficient, safe, and orderly orchestration of their movements and behavior.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for orchestrating the landing, launching, and loading behaviors of unmanned aerial vehicles (UAVs) operating proximate to a terminal area from which the UAVs are staged for delivering packages are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

UAVs that are provisioned to perform package delivery may operate out of a dedicated operations facility where more than one UAV is in operation. At these operations facilities (also referred to as a terminal area), it is imperative that terminal area maneuvers are efficient and minimize potential conflict between UAVs as well as between UAVs and any authorized personnel (e.g., merchant attendants) that may be at the operations facility. Two important conditions are the landing of UAVs upon return to the terminal area and the launching and successive package loading for departure from the terminal area.

One particular challenge is for UAVs that are loaded with packages at a terminal area that has minimal infrastructure/equipment beyond the UAVs, packages, and charging pads. The operational techniques and infrastructure disclosed herein detail terminal navigation and control behaviors as they pertain to landing, charging, launching, and loading UAVs with packages for aerial delivery. The techniques seek to improve efficiencies and reduce wasted flight times that negatively impact battery charges and reduce flight durations.

Figure 1:
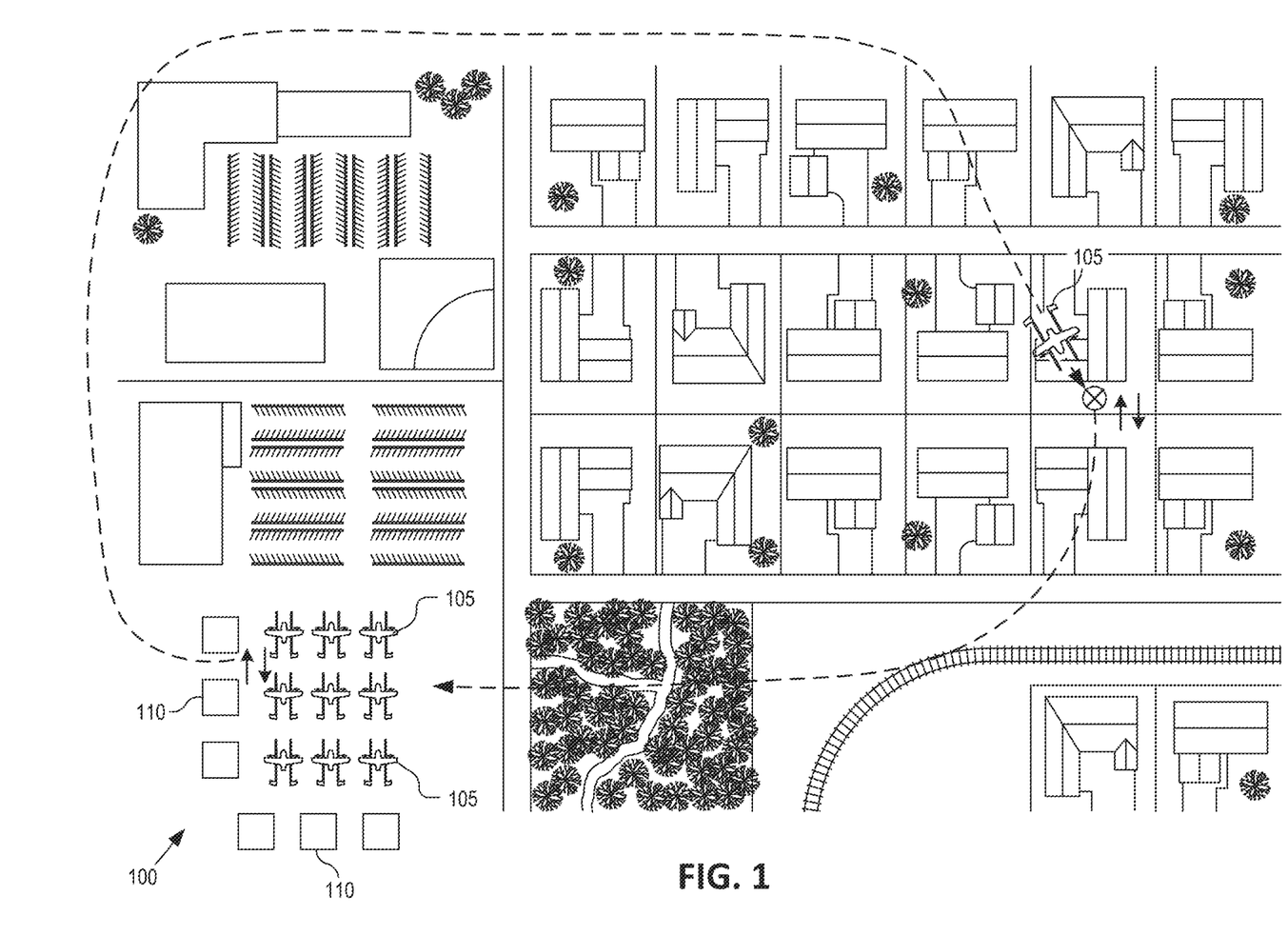
FIG. 1 is a plan view illustration of a terminal area for staging unmanned aerial vehicles (UAVs) that deliver packages to a neighborhood, in accordance with an embodiment of the disclosure.

FIG. 1 is a plan view illustration of a terminal area 100 for staging UAVs 105 that deliver packages to a neighborhood, in accordance with an embodiment of the disclosure. When UAV operations reach significant scale, UAV operators will need to maintain large fleets of UAVs potentially in locations with minimal infrastructure. This is particularly true in the case where UAVs are used for package delivery and staging areas may need to be positioned relatively close to the customer base. A likely scenario for UAV storage is for a UAV fleet to be staged from a facility, such as terminal area 100 (e.g., a warehouse or even open field with minimal supporting buildings 110 surrounding the open field), during times of recharging and loading. For these terminal areas, operators will need methods to manage these fleets, including how to get UAVs 105 in and out of terminal area 100, and in the case of package delivery that originates at the same facility, how to load packages onto the aircraft in an efficient manner that minimizes the time delay between a package being ready for delivery and the customer receiving the package. Presented here are ways to move, organize, and dynamically rearrange UAVs at terminal area 100.

Figure 2A:
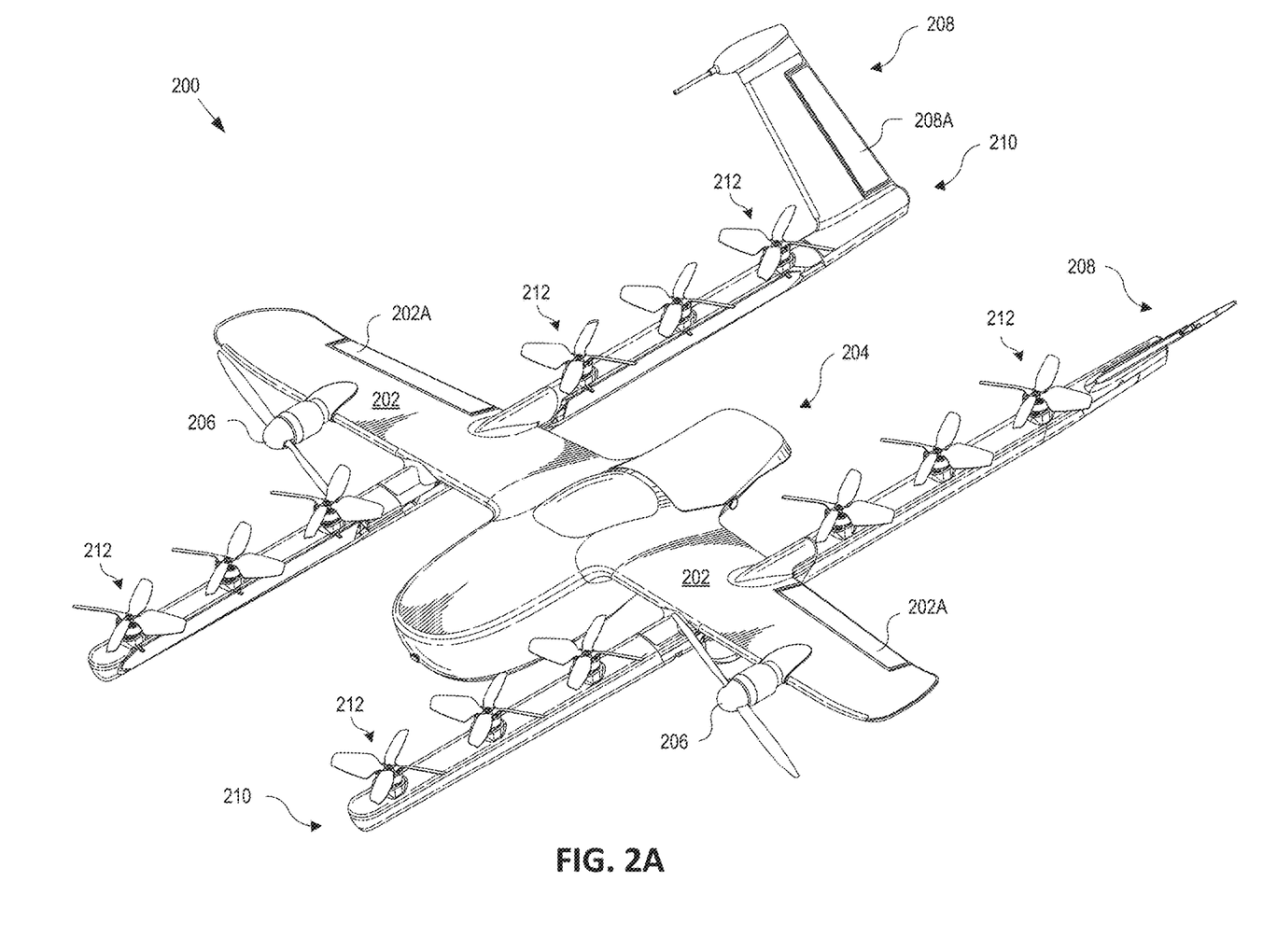
FIG. 2A is a topside perspective view illustration of a UAV configured for delivering packages, in accordance with an embodiment of the disclosure.
Figure 2B:
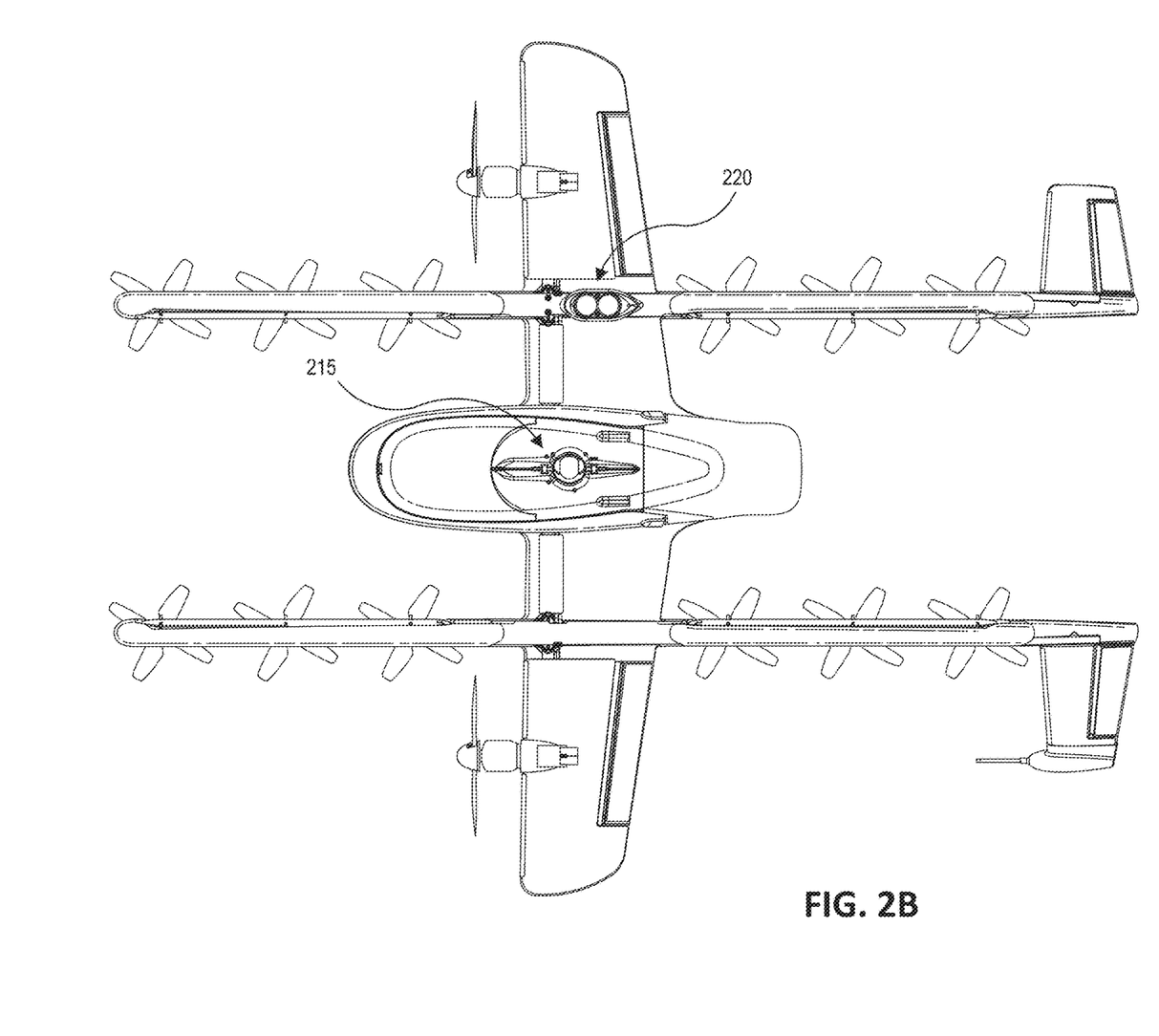
FIG. 2B is a bottom side plan view illustration of the UAV configured for delivering packages, in accordance with an embodiment of the disclosure.

FIGS. 2A and 2B illustrate an UAV 200 that is well suited for delivery of packages, in accordance with an embodiment of the disclosure. FIG. 2A is a topside perspective view illustration of UAV 200 while FIG. 2B is a bottom side plan view illustration of the same. UAV 200 is one possible implementation of UAVs 105 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, and a mission payload module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry of UAV 200, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). The mission payload module (e.g., middle portion of fuselage 204) houses equipment associated with a mission of UAV 200. For example, the mission payload module may include a payload actuator 215 (see FIG. 2B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 2B, an onboard camera 220 is mounted to the underside of UAV 200 to support a computer vision system for visual triangulation and navigation as well as operate as an optical code scanner for reading visual codes affixed to packages. These visual codes may be associated with or otherwise match to delivery missions and provide the UAV with a handle for accessing destination, delivery, and package validation information.

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 providing vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208a for controlling the aerial vehicle's yaw, and wing assembly 202 may include elevators for controlling the aerial vehicle's pitch and/or ailerons 202a for controlling the aerial vehicle's roll. As another example, increasing or decreasing the speed of all the propeller blades simultaneously can result in UAV 200 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3:
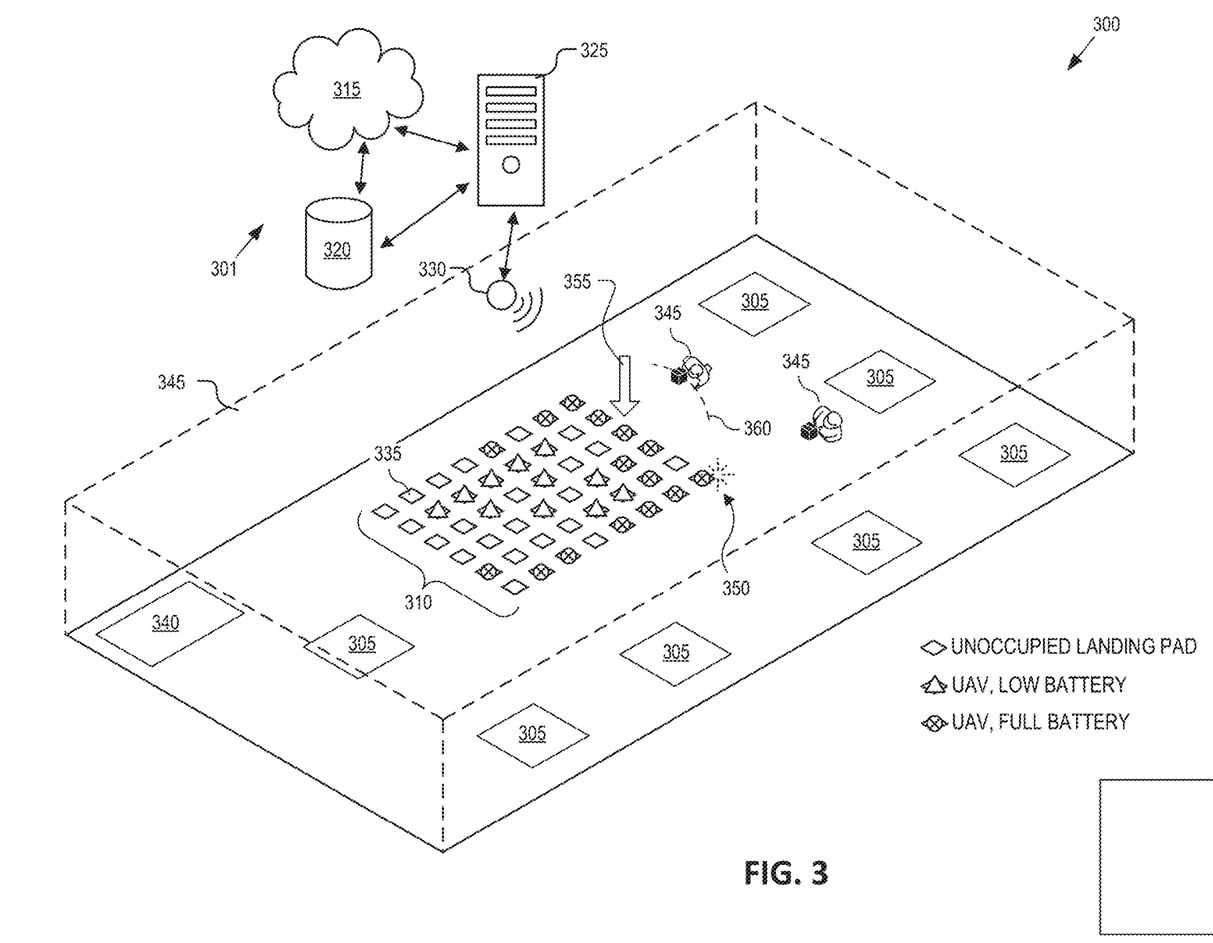
FIG. 3 is a perspective view illustration of a terminal area for UAVs having merchant facilities that prepare packages for delivery disposed about a periphery of a staging array for the UAVs, in accordance with an embodiment of the disclosure.

FIG. 3 is a perspective view illustration of a terminal area 300 for UAVs (e.g., UAVs 105) having merchant facilities 305 that prepare packages for delivery disposed about a periphery of a staging array 310, in accordance with an embodiment of the disclosure. Terminal area 300 is one possible implementation of terminal area 100 illustrated in FIG. 1. Also depicted in FIG. 3 are parts of a control system 301 (e.g., a "control tower") for the UAVs including network 315, storage 320, controller 325 (e.g., servers in a distributed system, local computer, a combination thereof, or the like), and communication system 330 (e.g., RF transceiver, WiFi transceiver, cellular transceivers, Bluetooth, or the like). The illustrated embodiment of staging array 310 includes pads 335 organized into an array (e.g., a rectangular array though other shapes may be used). A maintenance area 340 is also depicted.

Pads 335 serve as resting locations for UAVs 105 between delivery missions. In general, pads 335 may be referred to generically as "landing pads" or just "pads." Some or all of pads 335 may also include charging circuitry for charging the onboard batteries within UAVs 105 while resting or waiting for assignment of a delivery mission. Pads 335 that include charging circuitry may also be referred to as "charging pads." In general, pads 335 within the interior of staging array 335 are charging pads while pads 335 located about the perimeter or periphery of staging array 335 may or may not be charging pads. Pads 335 located about the periphery of staging array 310 are closest to merchant facilities 305. Due to their proximity and their relative safety for merchant attendants 345 to approach from merchant facilities 305, these pads are used for loading UAVs 105 with packages for aerial delivery, and thus also referred to as "peripheral loading pads."

Terminal area 300 represents a staging area from which UAVs 105 may operate to deliver packages to customers within a neighborhood using low or minimal infrastructure. Terminal area 300 may be implemented as a covered or partially covered facility (e.g., a warehouse, carport, etc.) or even an open field. In an open field concept, merchant facilities 305 may be permanent, semi-permanent, or temporary structures. For example, merchant facilities 305 may be tents, trailers, vehicles (e.g., food truck), mobile structures, or otherwise. Merchant facilities 305 provide a local base of operations for merchants or vendors to locally stock products or even prepare, assemble, and/or package products for aerial delivery. Merchant facilities 305 may operate as small staging facilities adjunct to larger businesses operating in the area that are using the aerial delivery service provided by the fleet of UAVs 105 and control system 301. As such, merchant attendants 345 may be employees of the individual merchants or of the aerial delivery service provider.

Terminal area 300 enables UAVs 105 to stage from a low or minimal infrastructure facility. The operation techniques described below facilitate a pick-up-over-pad operation where UAVs 105 are loaded with their packages while hovering directly over, or within close proximity of, the peripheral loading pads 335. Terminal area 300 itself may be a permanent staging area, a semi-permanent staging area, or even a temporary staging area. This low cost operational structure enables rapid deployment of a localized aerial delivery service (e.g., 10 mile radius) in times of urgent or temporary need (e.g., natural disasters, festivals, conventions, seasonal events, etc.).

During operation of the pick-up-over-pad strategy, UAVs 105 are directed to land on or maneuver to interior charging pads within staging array 310 for charging. As peripheral loading pads become available and the individual UAVs 105 are deemed sufficiently charged and ready for a new delivery mission, the UAVs 105 relocate or migrate from the interior charging pads towards the peripheral loading pads under their own propulsion. This migration may be choreographed by control system 301, or even occur as a series of decentralized decisions made by the individual UAVs 105. In one embodiment, the delivery missions are loaded into control system 301 as customer orders or merchant delivery requests are received via network 315. The delivery missions may be associated with specific packages by merchant attendants 345 at merchant facilities 305 and assigned to UAVs 105 over communication system 330. The UAVs 105 that are ready and waiting on a peripheral loading pad 335 are prioritized for assignment of a new delivery mission and loading of the associate package.

The illustrated embodiment of terminal area 300 includes maintenance area 340 to provide routine and/or remedial services to UAVs 105 in a supporting capacity to the aerial delivery service. Maintenance area 340 provides a location from which maintenance or repair technicians may operate and even work on UAVs 105. Maintenance or repair services may include swapping batteries, decommissioning UAVs, initial deployment of new UAVs 105 into the delivery fleet, performing repairs or scheduled maintenance, reconfiguring/provisioning modular components of UAVs 105 for specialized missions, or otherwise. UAVs 105 may automatically, or upon request, relocate to maintenance area 340 under their own power when possible, or be physically relocated by a service technician (e.g., human attendant) when needed.

Landing Behaviors

Figure 4:
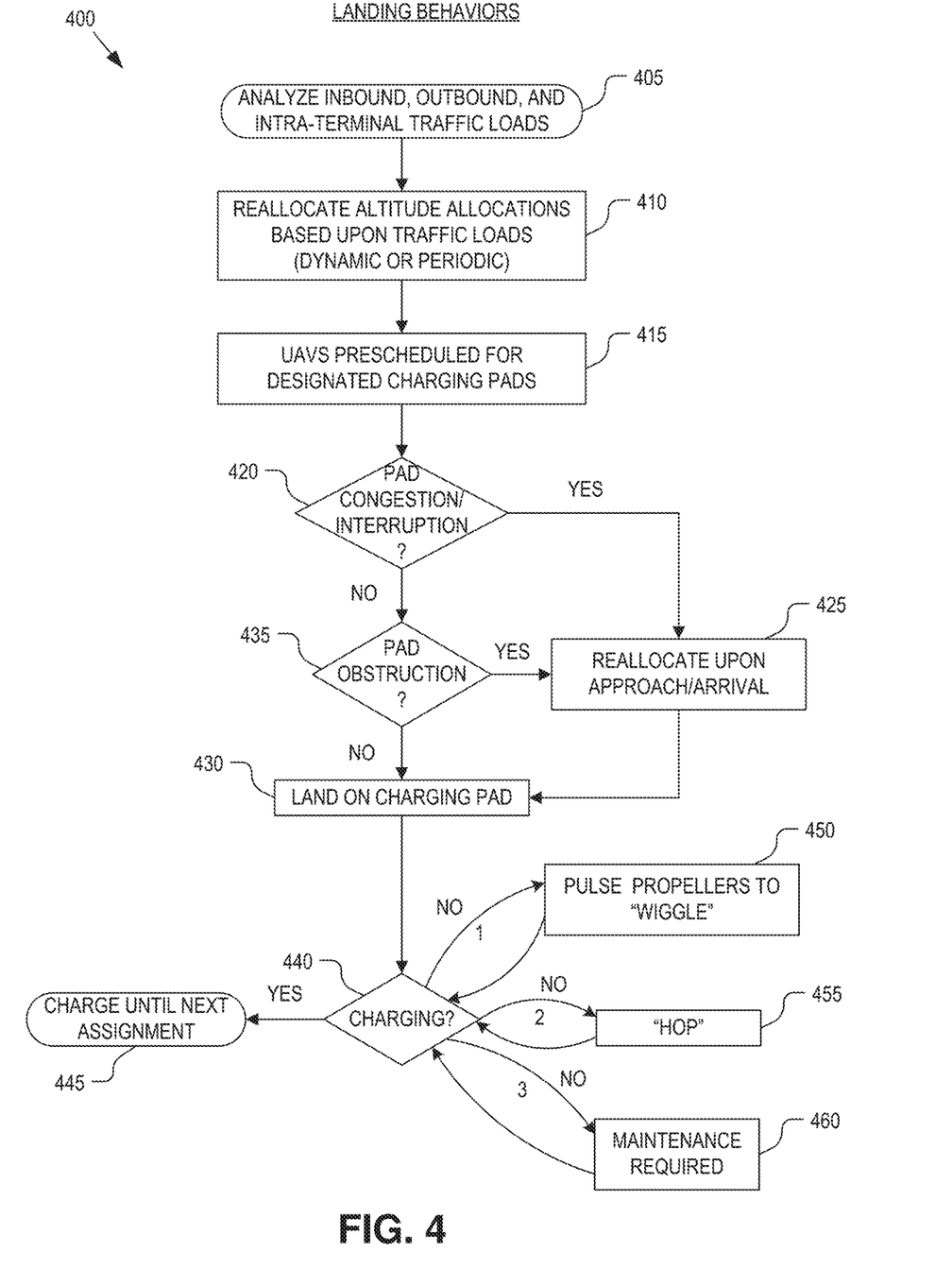
FIG. 4 is a flow chart illustrating landing behaviors of the UAVs when executing delivery missions, in accordance with an embodiment of the disclosure.

FIG. 4 is a flow chart illustrating a process 400 including various landing behaviors of the UAVs 105 when executing delivery missions, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Figure 5:
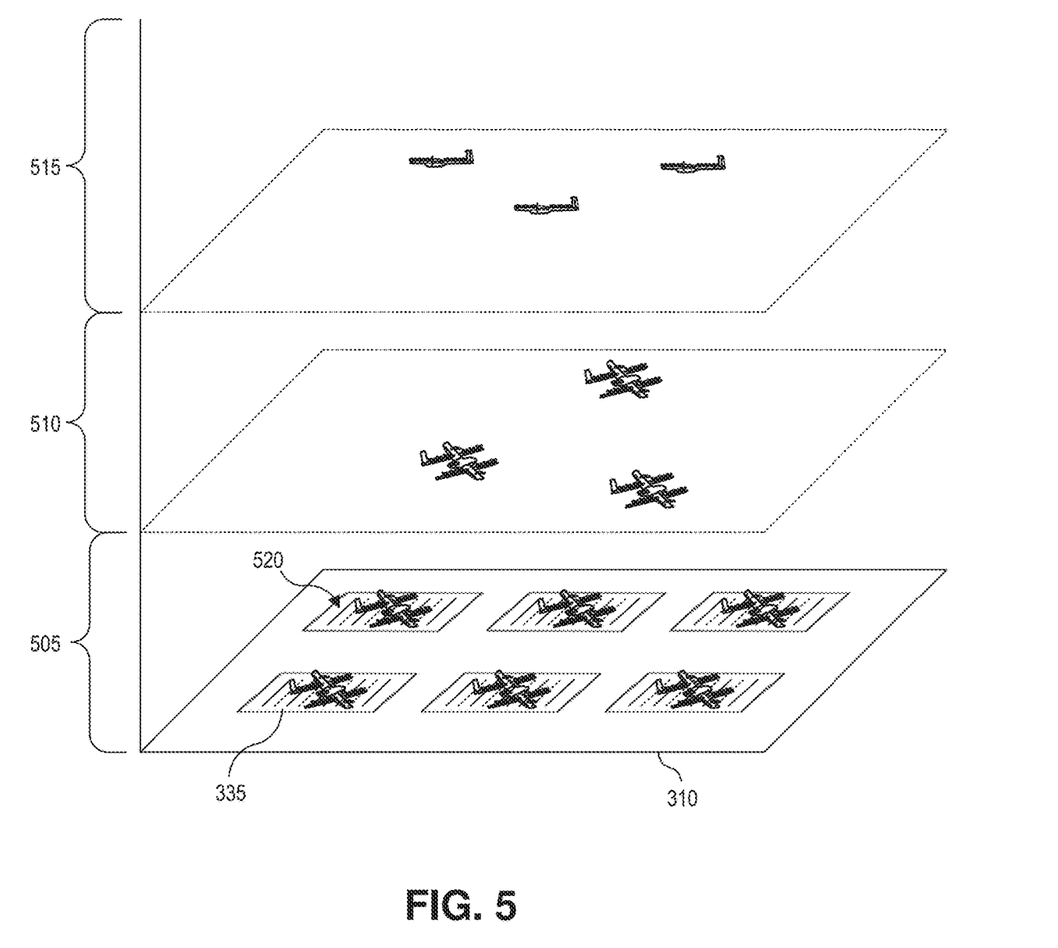
FIG. 5 illustrates how flight altitude slices may be dynamically adjusted between incoming, outgoing, and intra-facility UAV traffic, in accordance with an embodiment of the disclosure.

Upon returning to a centralized operations facility such as terminal area 300, there may be significant air traffic congestion. One method to aid in congestion mitigation is to allocate and reserve dedicated flight altitude slices for specific purposes (e.g. incoming UAV traffic, outgoing UAV traffic, intra-facility UAV traffic). These dedicated flight altitude slices could be further separated based on direction of planned travel (e.g. incoming traffic approaching from the North vs. from the South). FIG. 5 illustrates example flight altitude slices 505, 510, and 515 over staging array 310. In the illustrated embodiment, intra-facility UAV traffic is assigned the lowest flight altitude slice 505, outbound UAV traffic is assigned the mid-level flight altitude slice 510, and inbound UAV traffic is assigned the highest flight altitude slice 515. Of course, other combinations may be implemented.

Returning to FIG. 4, in a process block 405, control system 301 analyzes inbound, outbound, and intra-facility traffic loads. Based upon the existing traffic loads, flight altitude slices 505, 510, and 515 may be dynamically adjusted to better accommodate the needs of the UAV fleet and efficiently share the available airspace (process block 410). These adjustments may be real-time determined, periodically adjusted according to a schedule (e.g., time of day and/or season), or ad-hoc. For example, at the beginning of lunch time, outbound UAV traffic may be in greater demand while nearer to the end of lunch time inbound UAV traffic may be in greater demand. Accordingly, in one embodiment, flight altitude slice 510 assigned to outbound UAV traffic is temporarily expanded at the beginning of a lunch time and flight altitude slice 515 assigned to inbound UAV traffic is expanded at an end of the lunch time. Other adaptable schemes may be custom tailored to the demands of a particular terminal area 300.

Once inside the operations facility an inbound UAV 105 needs to land on one of pads 335 within staging array 310 for charging. This charging pad may typically be prescheduled with the UAV's delivery mission (process block 415). In other words, the particular landing/charging pad 335 may be predetermined by a central operations server (e.g., controller 325) and specified in the delivery mission as the terminal waypoint for the UAV. However, in some scenarios, the specific landing/charging pad 335 may need to be reassigned/reallocated (process block 425) upon approach or arrival due to congestion or interruption of the specified pad 335 (decision block 420). Again, this reallocation may be assessed by a central operation server, such as controller 325.

In yet other scenarios, the UAV itself may determine that the designated pad 335 is obstructed (decision block 435), in which case the UAV itself may make an ad-hoc, self-determination that it needs to select a new landing/charging pad 335 much like how a human driver selects a parking spot. In this latter scenario, the UAV may use onboard camera 220 as part of a computer vision system to determine an available landing pad 335 by recognizing certain visual cues. For example, as illustrated in FIG. 5, landing pads 335 may include one or more visual patterns 520 disposed thereon. The visual pattern may be a series of contiguous alternating stripes, matrix barcodes, 2D visual codes (e.g., quick response codes), or otherwise. If a given pad 335 is obstructed (e.g., taken by another UAV 105), then visual pattern 520 may be at least partially hidden. If the expected pattern is disrupted, the inbound UAV will determine that the designated landing pad 335 is no longer suitable and automatically search for (e.g. visually) or request a new landing pad 335. This ability to automatically find a suitable landing pad may also be used as a fallback measure by the UAVs 105, if communications are lost with controller 325, or as a final landing verification (safety measure) in conjunction with a pre-determined landing location specified in its delivery mission.

Upon landing, UAVs 105 may have provisions to automatically recharge their batteries. These provisions may include physical electrodes on the bottom side of the UAVs 105 that contact electrodes on charging pads 335. If UAV 105 does not engage correctly with charging pad 335, charging will not commence. A sufficient electrical connection may not be established due to a variety of reasons including poor orientation, debris on the electrical contacts (e.g., dirt, leaves, etc.), corrosion, or otherwise. In the event electrical contact is not properly established between UAV 105 and charging pad 335 (decision block 440), UAV 105 can self-detect that charging has not started (despite the aircraft having terminated its mission) and make additional attempts (process blocks 450 and 455) to properly engage with the charging infrastructure. In the illustrated embodiment, the first attempt at establishing a sufficient electrical connection includes pulsing one or more vertical lift rotors 212 to "wiggle" the UAV (process block 450). The UAV 105 may attempt multiple consecutive wiggle maneuvers to establish a connection. If this still does not establish an electrical connection, then the UAV 105 may drive the vertical lift rotors to "hop" up and down (e.g., hop less than 1 m high) on the charging pad 335 to establish a connection. Again, the UAV 105 may attempt multiple consecutive hops. Finally, if the UAV 105 is unable to successfully initiate charging, it may automatically remove itself from the available fleet by setting its state to "maintenance required" (process block 460). The UAV 105 may send a signal to controller 325 requesting service, reposition to a new charging pad 335, or reposition to maintenance area 340 to obtain service. On the other hand, once charging does commence, the UAV 105 will charge its batteries until it has reached a threshold charge level deemed ready to execute a next delivery mission (process block 445).

Launching & Loading Behaviors

For package delivery operations by UAVs, it is important to minimize the time between aircraft takeoff and package loading to reduce wasted energy consumption of a limited capacity battery. The pick-up-over-pad techniques described below apply to situations where a package is not directly loaded into a stationary UAV. The techniques employed enable and coordinate a close coupling of package availability (e.g. prepared, ready to be loaded) and aircraft takeoff/launch. These techniques are appropriate for UAVs which may be self-loading (e.g. the UAV performs the final package attachment through, for example, a hook and winch system) or which some level of human interaction to initiate the package loading (e.g. attaching a package to the aforementioned hook or other attachment point) is still required.

Figure 6:
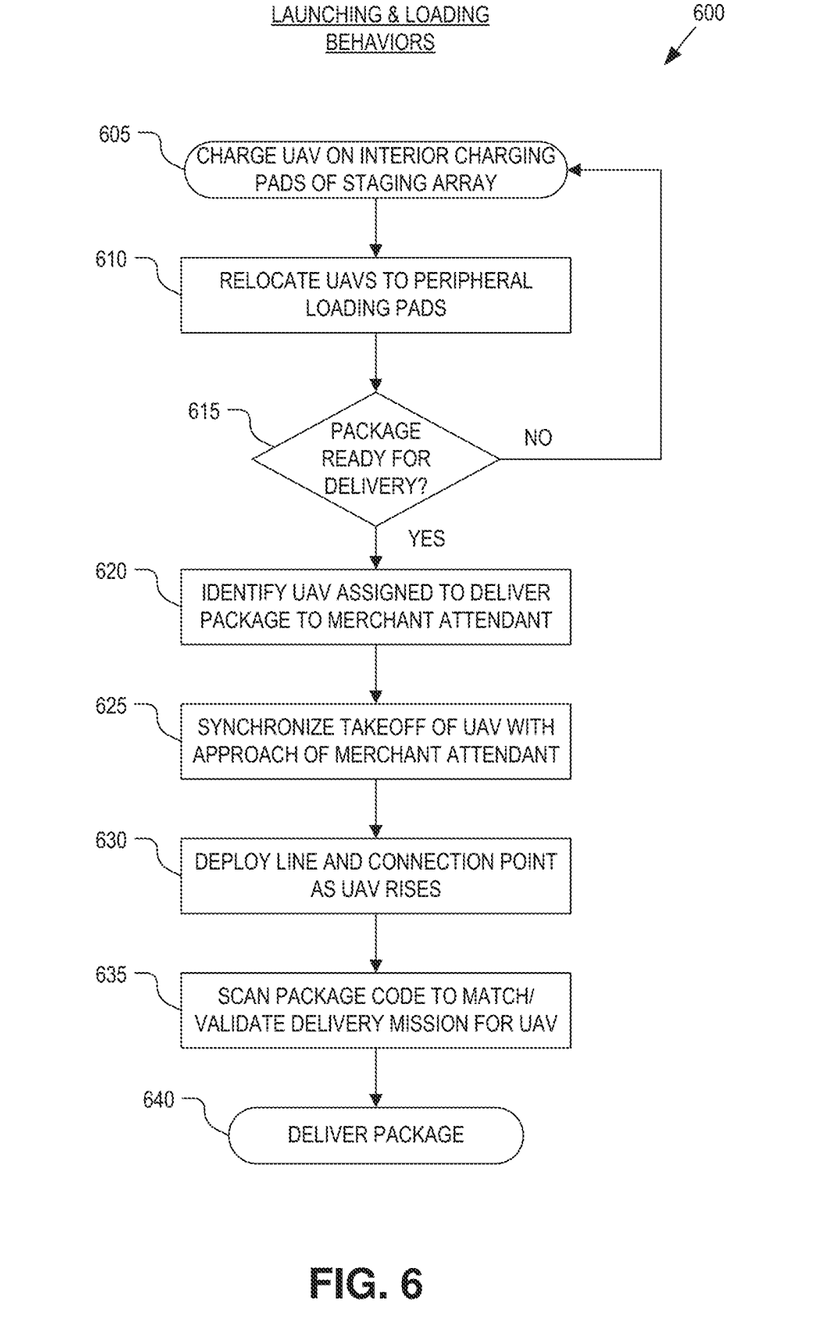
FIG. 6 is a flow chart illustrating launching and loading behaviors of UAVs when executing delivery missions, in accordance with an embodiment of the disclosure.

FIG. 6 is a flow chart illustrating launching and loading behaviors of UAVs 105 when executing delivery missions, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In a process block 605, a given UAV 105 is charged on an interior charging pad 335 after completing its previous delivery mission. As UAVs 105 reach a threshold level of charge, they reposition themselves under their own propulsion from the interior charging pads 335 of staging array 310 to a peripheral loading pad 335 as those pads become available (process block 610). Peripheral loading pads 335 are both closer to the merchant facilities 305 and safer for merchant attendants 345 to approach.

When a package becomes available for delivery at a merchant facility 305 (decision block 615), it is associated with a delivery mission and assigned to an available, mission ready UAV 105. The assigned UAV is identified to the merchant attendant 345 so that the merchant attendant 345 knows which UAV to load (process block 620). For example, in one embodiment, the assigned UAV 105 may identify itself by illuminating one or more lights 350 disposed on the UAV. These lights may be color coded and/or have a coded blink sequence to improve disambiguation between multiple UAVs 105 launching around the same time. In another embodiment, the lights 350 may alternatively (or additionally) be disposed on, or otherwise associated with, the peripheral loading pad 345 upon which the assigned UAV 105 is waiting. In yet another embodiment, merchant attendants 345 may wear head wearable displays that identify the assigned UAV 105 with an augmented reality image that operates as a virtual image overlay to the real-world. For example, the augmented reality image may be a virtual arrow 355 superimposed on the merchant attendant's vision positioned over the UAV 105 assigned to the particular delivery mission. Other augmented images or icons may be implemented. Of course, one or more of the above identification techniques may be used in conjunction with each other.

Effective and efficient identification of the assigned UAV helps synchronize UAV takeoff with the approach of the merchant attendant 345 (process block 625). Other synchronization techniques may also be implemented. For example, proximity sensors may be used to sense or monitor the merchant attendant's proximity to the assigned UAV 105. When the merchant attendant 345 crosses a threshold proximity 360, the assigned UAV 105 may be automatically triggered to launch and rise to a loading height (e.g., 5 m to 7 m) in preparation of loading the package. The proximity sensor may be disposed on the UAV, the launch pad, or otherwise integrated with terminal area 300. The proximity sensor may be implemented using video cameras, ultrasonic sensors, infrared sensors, time of flight sensors, various wireless technologies known in the art of proximity sensing, or otherwise.

Figure 7:
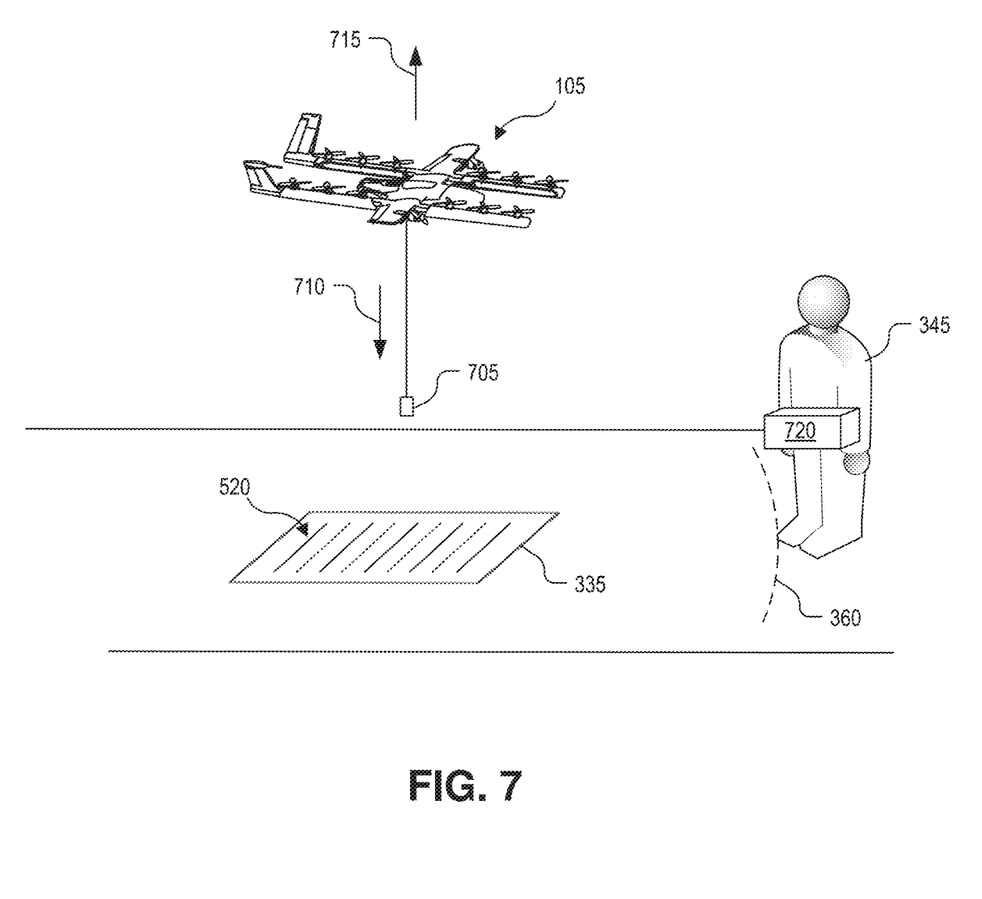
FIG. 7 illustrates synchronization of UAV takeoff and an approaching merchant attendant, in accordance with an embodiment of the disclosure.

In some embodiments, the UAV may perform other active maneuvers to reduce hover times and improve loading efficiency. For example, UAV 105 may move towards merchant attendant 345 as the merchant attendant is approaching the UAV. Wasted loading time may be further reduced by having a UAV 105 deploy its line and connection point in a tightly synchronized manner (process block 630). Referring to FIG. 7, as UAV 105 launches from pad 335, it may operate its onboard winch to deploy the line and connection point 705 in a synchronized manner. For example, UAV 105 may dispense the line and connection point 705 at a rate 710 that matches its ascension rate 715 so as to maintain connection point 705 at a substantially constant height as the UAV 105 ascends. This enables the merchant attendant 345 to load the UAV 105 with package 720 while the UAV 105 is ascending to start its delivery mission. In yet other embodiments, UAV 105 may use its computer vision system and onboard camera 220 to track the location of connection point 705 and keep it steady in cross winds by adjusting its own position, or even track the position of connection point 705 relative to merchant attendant 345 and actively guide connection point 705 towards merchant attendant 345.

The packages (e.g., package 720) may be coded to associate each package with its delivery mission. In one embodiment, the code is an optical code fixed to the exterior of the package (e.g., sticker with barcode or other 2D code). In other embodiments, the code is an RFID code embedded in or on the package. A package that is otherwise ready for aerial delivery may be matched to its mission (or otherwise validated) by scanning the code (process block 635). In one embodiment, the code is scanned by the merchant attendant 345 just prior to (or immediately after) attaching the package to the UVA 105. In another embodiment, the code is scanned by the UAV 105 after recoiling its line and tucking the package up under its fuselage. The UAV 105 may include an onboard scanner (e.g., onboard camera 220) for reading optical codes or RFID codes. Validation may also include measuring the weight of the package attached and comparing it against an expected weight range detailed in the delivery mission. Weight measurement may be executed via the onboard winch or even indirectly via vertical thrust needed to maintain UAV altitude. Finally, in a process block 640 the UAV 105 delivers its package to the customer via an aerial route.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for unmanned aerial vehicles (UAVs) operating at a terminal area from which the UAVs are staged, the method comprising:
   charging a plurality of the UAVs on charging pads disposed in a staging array at the terminal area, wherein merchant facilities adapted for preparing packages for delivery by the UAVs are disposed peripheral to the staging array along one or more sides of the staging array; and
   relocating the UAVs under their own propulsion from interior charging pads of the charging pads in the staging array to peripheral loading pads of the staging array as the peripheral loading pads are deemed available to receive the UAVs and the UAVs reach one or more threshold charge levels associated with readiness for delivery missions, wherein the relocating for a corresponding one of the UAVs is after the corresponding one of the UAVs receives an initial charge at one of the interior charging pads and prior to the corresponding one of the UAVs commencing one of the delivery missions, wherein the peripheral loading pads also include charging circuitry for charging the UAVs.

2. The method of claim 1, further comprising:
   in response to one of the merchant facilities indicating that a first package of the packages is deemed ready for delivery, identifying a first UAV of the UAVs disposed on one of the peripheral loading pads, wherein the first UAV is assigned to accept the first package for delivery; and
   synchronizing a takeoff of the first UAV with an approach of a merchant attendant that loads the first UAV with the first package.

3. The method of claim 2, wherein identifying to the merchant attendant the first UAV of the UAVs comprises at least one of:
   illuminating a first light on the first UAV;
   illuminating a second light associated with the one of the peripheral loading pads upon which the first UAV is positioned; or
   displaying an augmented reality image from a head wearable display worn by the merchant attendant, the augmented reality image visually identifying the first UAV from others of the UAVs.

4. The method of claim 2, wherein synchronizing the takeoff of the first UAV with the approach of the merchant attendant comprises:
   sensing a proximity of the merchant attendant to the first UAV; and executing the takeoff of the first UAV when the merchant attendant comes within a threshold proximity of the first UAV.

5. The method of claim 2, further comprising:
deploying a line and a connection point for connecting to the first package from the first UAV with an onboard winch as the first UAV ascends during the takeoff from the one of the peripheral loading pads, wherein the line is dispensed at a rate that matches an ascending rate of the first UAV so as to maintain the connection point at a constant height as the first UAV ascends.

6. The method of claim 2, further comprising:
scanning a code disposed in or on the first package to match or validate a first delivery mission for the first package to the first UAV, wherein the code is associated with the first delivery mission.

7. The method of 6, wherein scanning the code comprises one of:
scanning an optical code adhered to the first package with an onboard camera disposed on the first UAV after the first package is attached to the first UAV; or
scanning a radio frequency identifier (RFID) disposed in or on the first package with an RFID reader disposed on the first UAV.

8. The method of claim 1, further comprising:
reserving flight altitude slices over the terminal area for incoming UAV traffic, outgoing UAV traffic, and intra-facility UAV traffic; and
dynamically adjusting the flight altitude slices between the incoming UAV traffic, the outgoing UAV traffic, and the intra-facility UAV traffic based upon demand by the UAVs.

9. The method of claim 8, wherein dynamically adjusting the flight altitude slices comprises expanding a first one of the flight altitude slices assigned to outgoing UAV traffic at a beginning of a predetermined period or expanding a second one of the flight altitude slices assigned to the incoming UAV traffic at an ending of the predetermined period.

10. The method of claim 1, further comprising:
assigning a first delivery mission of the delivery missions to a first UAV of the UAVs, wherein the first delivery mission includes an assignment of a first charging pad of the charging pads to the first UAV for charging the first UAV upon return of the first UAV to the terminal area after delivering the first package;
reassigning the first UAV to another charging pad of the charging pads different from the first charging pad, while the first UAV is approaching the terminal area or after arrival at the terminal area, if the first charging pad becomes at least partially obstructed subsequent to assigning the first delivery mission to the first UAV.

11. The method of claim 10, further comprising:
identifying by the first UAV upon return to the terminal area that a visual pattern on the first charging pad is obscured such that the first charging pad is deemed obstructed, wherein the first UAV uses an onboard camera for the identifying; and
selecting or requesting by the first UAV a second charging pad of the charging pads different from the first charging pad, in response to identifying that the visual pattern is visually obscured such that the first charging pad is deemed obstructed.

12. The method of claim 1, further comprising:
landing the first UAV on a first charging pad of the charging pads upon return to the terminal array after delivery of the first package; and pulsing one or more vertical lift motors of the first UAV to wiggle the first UAV on the first charging pad, if an electrical connection between the first UAV and the first charging pad is not sufficiently established upon landing to commence charging of the first UAV from the first charging pad.

13. The method of claim 12, further comprising:
driving the one or more vertical lift motors to hop the first UAV up and down on the first charging pad if wiggling the first UAV does not sufficiently establish the electrical connection to commence the charging of the first UAV.

14. At least one non-transitory machine-accessible storage medium that provides instructions that, when executed by one or more machines, will cause the one or more machines to perform operations comprising:
charging a plurality of unmanned aerial vehicles (UAVs) on charging pads disposed in a staging array at a terminal area from which the UAVs are staged, wherein merchant facilities adapted for preparing packages for delivery by the UAVs are disposed peripheral to the staging array along one or more sides of the staging array; and
relocating the UAVs under their own propulsion from interior charging pads of the charging pads in the staging array to peripheral loading pads of the staging array as the peripheral loading pads are deemed available to receive the UAVs and the UAVs reach one or more threshold charge levels associated with readiness for delivery missions, wherein the relocating for a corresponding one of the UAVs is after the corresponding one of the UAVs receives an initial charge at one of the interior charging pads and prior to the corresponding one of the UAVs commencing one of the delivery missions.

15. The at least one non-transitory machine-accessible storage medium of claim 14, further providing instructions that, when executed by the one or more machines, will cause the one or more machines to perform further operations, comprising:
in response to one of the merchant facilities indicating that a first package of the packages is deemed ready for delivery, identifying a first UAV of the UAVs disposed on one of the peripheral loading pads, wherein the first UAV is designated to accept the first package for delivery; and
synchronizing a takeoff of the first UAV with an approach of a merchant attendant that loads the first UAV with the first package.

16. The at least one non-transitory machine-accessible storage medium of claim 15, wherein identifying to the merchant attendant the first UAV of the UAVs comprises at least one of:
illuminating a first light on the first UAV;
illuminating a second light associated with the one of the peripheral loading pads upon which the first UAV is positioned; or
displaying an augmented reality image from a head wearable display worn by the merchant attendant, the augmented reality image visually identifying the first UAV from others of the UAVs.

17. The at least one non-transitory machine-accessible storage medium of claim 15, wherein synchronizing the takeoff of the first UAV with the approach of the merchant attendant comprises:
sensing a proximity of the merchant attendant to the first UAV; and executing the takeoff of the first UAV when the merchant attendant comes within a threshold proximity of the first UAV.

18. The at least one non-transitory machine-accessible storage medium of claim 15, further providing instructions that, when executed by the one or more machines, will cause the one or more machines to perform further operations, comprising:
deploying a line and a connection point for connecting to the first package from the first UAV with an onboard winch as the first UAV ascends during the takeoff from the one of the peripheral loading pads, wherein the line is dispensed at a rate that matches an ascending rate of the first UAV so as to maintain the connection point at a constant height as the first UAV ascends.

19. The at least one non-transitory machine-accessible storage medium of claim 14, further providing instructions that, when executed by the one or more machines, will cause the one or more machines to perform further operations, comprising:
reserving flight altitude slices over the terminal area for incoming UAV traffic, outgoing UAV traffic, and intra-facility UAV traffic; and
dynamically adjusting the flight altitude slices between the incoming UAV traffic, the outgoing UAV traffic, and the intra-facility UAV traffic based upon demand by the UAVs.

20. The at least one non-transitory machine-accessible storage medium of claim 19, wherein dynamically adjusting the flight altitude slices comprises expanding a first one of the flight altitude slices assigned to outgoing UAV traffic at a beginning of a predetermined period or expanding a second one of the flight altitude slices assigned to the incoming UAV traffic at an ending of the predetermined period.

21. The at least one non-transitory machine-accessible storage medium of claim 14, further providing instructions that, when executed by the one or more machines, will cause the one or more machines to perform further operations, comprising:
assigning a first delivery mission of the delivery missions to a first UAV of the UAVs, wherein the first delivery mission includes an assignment of a first charging pad of the charging pads to the first UAV for charging the first UAV upon return of the first UAV to the terminal area after delivering the first package;
reassigning the first UAV to another charging pad of the charging pads different from the first charging pad, while the first UAV is approaching the terminal area or after arrival at the terminal area, if the first charging pad becomes at least partially_ obstructed subsequent to assigning the first delivery mission to the first UAV.

22. The at least one non-transitory machine-accessible storage medium of claim 21, further providing instructions that, when executed by the one or more machines, will cause the one or more machines to perform further operations, comprising:
identifying by the first UAV upon return to the terminal area that a visual pattern on the first charging pad is obscured such that the first charging pad is deemed obstructed, wherein the first UAV uses an onboard camera; and
selecting or requesting by the first UAV a second charging pad of the charging pads different than the first charging pad, in response to identifying that the visual pattern is visually obscured such that the first charging pad is deemed obstructed.

23. The at least one non-transitory machine-accessible storage medium of claim 14, further providing instructions that, when executed by the one or more machines, will cause the one or more machines to perform further operations, comprising:
landing the first UAV on a first charging pad of the charging pads upon return to the terminal array after delivery of the first package; and
pulsing one or more vertical lift motors of the first UAV to wiggle or hop the first UAV on the first charging pad, if an electrical connection between the first UAV and the first charging pad is not sufficiently established upon landing to commence charging of the first UAV from the first charging pad.

24. A method for unmanned aerial vehicles (UAVs) operating at a terminal area from which the UAVs are staged, the method comprising:
charging a plurality of the UAVs on charging pads disposed in a staging array at the terminal area, wherein merchant facilities adapted for preparing packages for delivery by the UAVs are disposed peripheral to the staging array along one or more sides of the staging array;
relocating the UAVs under their own propulsion from interior charging pads of the charging pads in the staging array to peripheral loading pads of the staging array as the peripheral loading pads are deemed available to receive the UAVs and the UAVs reach one or more threshold charge levels associated with readiness for delivery missions;
in response to one of the merchant facilities indicating that a first package of the packages is deemed ready for delivery, identifying a first UAV of the UAVs disposed on one of the peripheral loading pads, wherein the first UAV is assigned to accept the first package for delivery; and
synchronizing a takeoff of the first UAV with an approach of a merchant attendant that loads the first UAV with the first package.

* * * * *